(12) United States Patent
Lim (10) Patent No.: US 9,930,501 B2
(45) Date of Patent: *Mar. 27, 2018

(54) SYSTEM AND METHOD FOR CONVEYING PERSONAL INFORMATION THROUGH CELLULAR TEXT MESSAGING SERVICES

(71) Applicant: LIFE IN MOBILE INNOVATIONS, INC., Stamford, CT (US)

(72) Inventor: John Lim, Rye Brook, NY (US)

(73) Assignee: LIM EMPIRE, INC., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,571

(22) Filed: Oct. 12, 2015

(65) Prior Publication Data

US 2016/0037314 A1 Feb. 4, 2016

Related U.S. Application Data

(63) Continuation of application No. 11/966,419, filed on Dec. 28, 2007, now Pat. No. 9,161,182.

(60) Provisional application No. 60/878,021, filed on Dec. 29, 2006.

(51) Int. Cl.
*G06F 17/30* (2006.01)
*H04W 4/14* (2009.01)
*H04W 4/12* (2009.01)

(52) U.S. Cl.
CPC ........ *H04W 4/14* (2013.01); *G06F 17/30477* (2013.01); *G06F 17/30554* (2013.01); *G06F 17/30864* (2013.01); *H04W 4/12* (2013.01)

(58) Field of Classification Search
CPC ......... G06F 17/30477; G06F 17/30554; G06F 17/30864; H04W 4/14; H04W 4/12

USPC .......................................... 707/770; 709/203
See application file for complete search history.

(56) References Cited

U.S. PATENT DOCUMENTS

| | | | |
|---|---|---|---|
| 6,108,534 A | 8/2000 | Bourgeois et al. | |
| 6,175,741 B1 | 1/2001 | Alperovich | |
| 6,560,456 B1 | 5/2003 | Lohtia et al. | |
| 6,714,793 B1* | 3/2004 | Carey et al. | 455/466 |
| 6,983,310 B2 | 1/2006 | Rouse et al. | |
| 7,149,537 B1 | 12/2006 | Kupsh et al. | |
| 2001/0049274 A1 | 12/2001 | Degraeve | |
| 2004/0092250 A1 | 5/2004 | Valloppillil | |
| 2004/0092272 A1 | 5/2004 | Valloppillil | |
| 2004/0092273 A1 | 5/2004 | Valloppillil | |
| 2004/0137921 A1 | 7/2004 | Valloppillil et al. | |
| 2004/0171396 A1* | 9/2004 | Carey et al. | 455/466 |
| 2005/0103838 A1* | 5/2005 | Slotkin et al. | 235/380 |

(Continued)

OTHER PUBLICATIONS

Juho Määttä et al., Mobile short data services as a carrier for message communications, 2013, IEEE, 497-502.*

*Primary Examiner* — Jean B Fleurantin
(74) *Attorney, Agent, or Firm* — Charles A. Rattner (57) ABSTRACT

The present invention provides a system and method for sending a cellular text message to a system server through a data network, including an identification of a requested database record and a forward address. The system server then performs a database lookup or related search and sends an enhanced message or a file to the forward address, which could be a cellular phone, e-mail address, server, computer, mobile device, or any hardware or device associated with the intended recipient that is communicatively coupled to the system server.

10 Claims, 5 Drawing Sheets

(56) References Cited

U.S. PATENT DOCUMENTS

| | | |
|---|---|---|
| 2005/0251448 A1 | 11/2005 | Gropper |
| 2006/0079211 A1 | 4/2006 | Degraeve |
| 2006/0136251 A1 | 6/2006 | Sung et al. |
| 2006/0235931 A1 | 10/2006 | Ruthe et al. |
| 2007/0081649 A1 | 4/2007 | Baudino et al. |

* cited by examiner

Raymond Lim

Mobile Card Cast (877)252-9277 sales@osmpartners.net

923 Sawmill River Rd.

Suite 189

Ardsley, NY 10502

SYSTEM AND METHOD FOR CONVEYING PERSONAL INFORMATION THROUGH CELLULAR TEXT MESSAGING SERVICES

CROSS-REFERENCE TO RELATED APPLICATIONS

This patent application claims priority under 35 U.S.C. § 120 as a continuation of pending U.S. patent application Ser. No. 11/966,419 entitled "SYSTEM AND METHOD FOR CONVEYING PERSONAL INFORMATION THROUGH CELLULAR TEXT MESSAGING SERVICES," filed in the name of John Lim on Dec. 28, 2007, which in turn claims priority under 35 U.S.C. § 119 to U.S. provisional patent application Ser. No. 60/878,021 entitled "SYSTEM AND METHOD FOR CONVEYING PERSONAL INFORMATION" filed in the name of John Lim on Dec. 29, 2006, the contents of both of which are incorporated herein by reference in their entirety.

FIELD OF THE DISCLOSURE

The present invention relates to the field of messaging, and more particularly to the use of the cellular communication text messaging services and a database to efficiently convey predefined information or files from a sender to a recipient in a unique and easy to read format.

BACKGROUND OF THE DISCLOSURE

The use of cellular text messaging services (CTMS), such as the Short Message Service (SMS) available for Global System for Mobile Communications (GSM), for various purposes is known. Typically, one of two scenarios is employed. In a first scenario, a message is defined by the sender and communicated to the recipient, as the entire communication. In a second scenario, the sender sends a code to the recipient, which then responds with corresponding information to the sender. Thus, a typical CTMS communication involves only two parties, though multiple recipients of a message or broadcast were contemplated.

SMS was originally designed as part of GSM, but is now available on a wide range of networks, including 3G networks. However, not all text messaging systems use SMS, and some notable alternate implementations of the concept include J-PHONE'S SKYMAIL and NTT DOCOMO'S SHORT MAIL, both in Japan. E-mail messaging from phones, as popularized by NTT DOCOMO'S I-MODE and the RIM BLACKBERRY, also typically use standard mail protocols such as SMTP over TCP/IP.

Transmission of the short messages between SMSC and phone can be done through different protocols such as SS7 within the standard GSM MAP framework or TCP/IP within the same standard. Messages are sent with the additional MAP operation forward_short_message, whose payload length is limited by the constraints of the signaling protocol to a maximum of 140 bytes (140 bytes=140*8 bits=1120 bits). In practice, this translates to 160 7-bit characters, 140 8-bit characters, or 70 16-bit characters. Routing data and other metadata is additional to the payload size.

A Short Message Service Center (SMSC) is a network element in the mobile telephone network, which delivers SMS messages. When a user sends a text message (SMS message) to another user, the phone actually sends the message to the SMSC. The SMSC stores the message and then delivers it to the destination user when they are available. This is a store and forward operation. The SMSC usually has a configurable time limit for how long it will store the message, and users can usually specify a shorter time limit if they want. For bulk transmission and reception of SMS messages, SMSCs have conventional, fixed, network interfaces as well as mobile network interfaces. A number of protocols have been defined to support this sort of wire-line access:

SMPP (Short message peer-to-peer) The most common protocol and the only non-proprietary one in wide use.

EMI/UCP (External Machine Interface/Universal Computer Protocol) A proprietary protocol by market leader LOGICACMG.

CIMD (Computer Interface to Message Distribution) A proprietary protocol developed by NOKIA for its ARTUSE SMSC.

OIS (Open Interface Specification) Despite the name, a proprietary protocol developed by SERNA GROUP (now AIRWIDE SOLUTIONS).

Larger content (known as long SMS or concatenated SMS) can be sent segmented over multiple messages, in which case each message will start with a user data header (UDH) containing segmentation information. Since UDH is inside the payload, the number of characters per segment is lower: 153 for 7-bit encoding, 134 for 8-bit encoding and 67 for 16-bit encoding. The receiving phone is then responsible for reassembling the message and presenting it to the user as one long message. While the standard theoretically permits up to 255 segments, 6 to 8 segment messages are the practical maximum, and long messages are billed as equivalent to multiple SMS messages.

Short messages can also be used to send binary content such as ringtones or logos, as well as OTA programming or configuration data. Such uses are a vendor-specific extension of the GSM specification and there are multiple competing standards, although NOKIA's SMART MESSAGING is by far the most common.

SMS is also used for machine-to-machine communication. For instance, there is an LED display machine controlled by SMS, and some vehicle tracking companies like ESITRACK use SMS for their data transport or telemetry needs.

SMS is widely used for delivering premium content such as news alerts, financial information, logos and ring tones. Such messages are also known as premium-rated short messages (PSMS). The subscribers are charged extra for receiving this premium content, and the amount is typically divided between the mobile network operator and the content provider (VASP) either through revenue share or a fixed transport fee.

Premium short messages are also increasingly being used for "real-world" services. For example, some vending machines now allow payment by sending a premium-rated short message, so that the cost of the item bought is added to the user's phone bill or subtracted from the user's prepaid credits.

A new type of "free premium" or "hybrid premium" content has emerged with the launch of text-service websites. These sites allow registered users to receive free text messages when items they are interested go on sale, or when new items are introduced.

SUMMARY OF THE DISCLOSURE

The present invention provides a system and method for sending a text message through a data network, to a server, including an identification of a database record and a forward address. The server then performs a database lookup and sends an enhanced message, such as contact information in the form of a customized mobile business card or a file to the forward address. The system and method is compatible with various text messaging systems.

A preferred use for this system, and method is to convey contact information, such as a v-card, by simply entering the service identifier and the forward address. The identity of the sender can readily be determined based on the routing information of the message. As necessary, the sender can have a plurality of messages hosted on the server, and may then select one or more of the messages to be communicated to the recipient.

The message sent to the server may include, for example, login/password information, other authentication information, or commands for the server and/or the database (e.g., to search the database based on a search criteria provided in the message). The message received at the forward address may be fixed, or variant. For example, the message may be dependent on recipient address (telephone number), time of day or day of week, location of sender (e.g., language, time zone, etc.), or other factors.

Typically, the use of this system incurs charges for a number of components: the initial sent message, the use of the server and the sending of the forward message, and the receipt of the message. It is noted that the system need not be implemented on a cellular phone, so, for example, the message may originate and terminate using email, wifi or any portion of the system may be e-mail or wifi. Likewise, the forward address may be a multicast, for example sending the same message to multiple cell phones and/or email accounts, or other communications destinations.

The server may be a SMSC-type server, an Internet web server, or a hybrid system supporting communications using both systems, and/or additional systems such as wifi. Preferably, the sender account is set up and administered though the Internet, and therefore the database structure may be defined through a web browser or email interface, thus alleviating the need to enter and administer the information through a cell phone user interface, and to avoid the potential costs associated therewith.

The system and method supports a business method of charging users, typically the sender, for the use of the message translation (e.g., database lookup) and forwarding service. The user may also be charged for storage of the data on the server.

For example, a web interface is provided for the server, which provides a user interface that supports account login, and message creation. The preferred interface has a "preview", to permit a user to understand what message will actually be sent, a text counter (per box) to allow the user to stay within message payload limits, and provide multiple templates for different intended uses. Where the text is dynamic, a point and click programming model is preferred, although for more sophisticated users, a command line interface or script interface may also be supported. Such interface may be used for creation of user-specific commands for, e.g., database updates, etc.

The system typically is allocated a block of SMS assigned addresses (numbers), although it can use a single number, or even a subaddress of a number.

Preferably, an intended recipient of a message will have its own account maintained, including all (or a portion of) the messages sent to that address. This log permits a user to review the messages, for example to properly import these into a SIM card or other database, and to store and maintain the information separate from the target device, e.g., cell phone or email browser.

It is therefore an object of the invention to provide a system and method for receiving a short text message having an expressly communicated or implied sender and defined recipients(s), modifying the message at a server in dependence on at least one rule, and optionally based on a sender code, a recipient characteristic, and extrinsic data, and sending the modified message to the recipient(s).

It is also an object of the invention to provide a system and method for receiving a short text message having an expressly communicated or implied sender, generating a message at a server in dependence on at least one rule, and optionally based on a sender code, a sender characteristic, and extrinsic data, and sending the generated message back to the sender.

It is yet another object of the present invention to provide a system and method for sending a text message to a server through a data network, including an identification of a forward address, wherein, upon receiving the text message, the server performs a database lookup or related search and sends an enhanced message or a file to the forward address, which could be a cellular phone, server, computer, or any hardware associated with the intended recipient.

It is yet another object of the present invention to provide a system and method for sending a text message to a server through a data network, including an identification of a forward address, wherein, upon receiving the text message, the server updates its database.

It is yet another object of the present invention to provide a system and method for sending a text message to a server through a data network, including an identification of a forward address, to control a household equipment such as lights or heating and cooling system.

It is yet another object of the present invention to provide the system and method that are compatible with various text messaging systems.

The purpose of the mobile business card/mobile signature is to provide an inexpensive and convenient way to share contact information though the mobile space. By using the mobile business card/mobile signature, a member no longer has to carry a traditional business card. It will also allow a member to have an easy and efficient way to store and share contacts. The member may simply send the contact data to a recipient or give out their unique mobile ID to another to enable that mobile phone user to request the data themselves from the server. The information is then sent by the server to the mobile phone user. This feature is particularly useful when the member is at a trade show or giving a presentation to a large audience. The member need merely provide or post their mobile ID and anyone at the show or in the audience having an interest in obtaining contact information can do so by contacting the server and providing the mobile ID. Thereafter, the contact information is provided to the requester. At the same time, the server retains a permanent record of to whom the business card/mobile signature was distributed.

Further objects will become apparent from the following descriptions.

BRIEF DESCRIPTION OF THE DRAWINGS

The objects, features and advantages of the present disclosure will be more fully understood by reference to the following, detailed description of the preferred, albeit illustrative, embodiments of the present disclosure, when taken in conjunction with the accompanying figures, wherein.

DETAILED DESCRIPTION OF THE PREFERRED EMBODIMENTS

The objects, features and advantages of the present disclosure will be apparent from a consideration of the following exemplary embodiments.

A user interface is provided using a web server to permit a user to define a message to be defined and/or forwarded to recipient(s), who may be the same or different than the sender. Typical fields can include, without limitation, the following:
1) name
2) company name
3) title
4) phone
5) phone 2
6) email
7) internal address
8) street
9) city state zip In addition, in order to efficiently use the SMS service, a character counter is provided to alert the user how much of a message payload remains. Of course, a long message format (multiple short messages) may also be used, in which case additional information, such as a photo or logo, may also be communicated.

Figure 1:
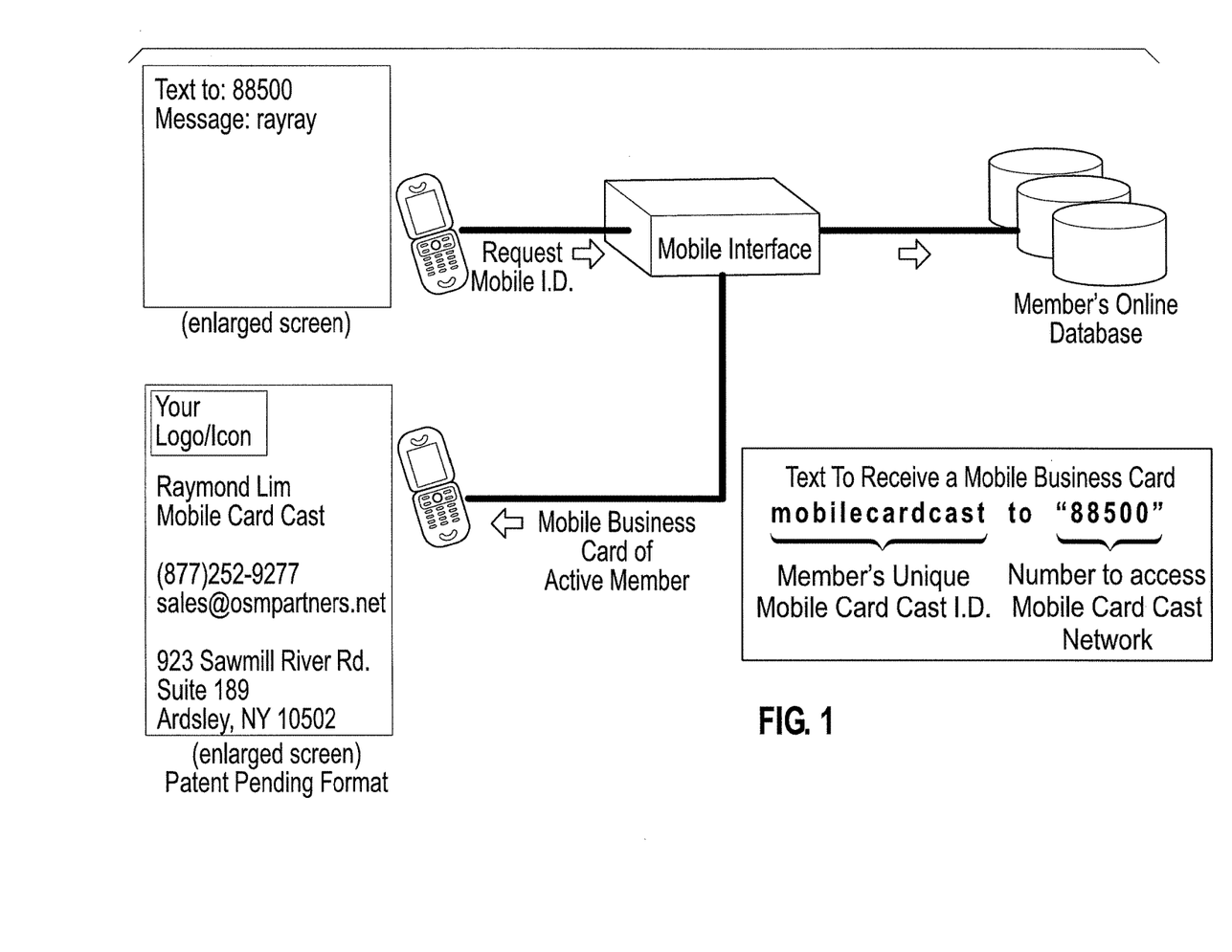
FIG. 1 shows a schematic diagram of one exemplary embodiment of the present disclosure.

Referring to the schematic drawing of FIG. 1, which illustrates one exemplary embodiment of the present disclosure, an autoresponder system is provided. First, a user sends a text message to a server/short code gateway, for example "88500," with an identifier of the message being requested, e.g., the member's mobile ID. An autoreply message is then sent, including the appropriate database record corresponding to the request, which would be the member's mobile signature/mobile business card. As shown in FIG. 1, the message sent by the requester to the server/short code gateway "88500" would look like "rayray". The gateway, would respond with the pre-selected message such as that shown in FIG. 3. Members can be assigned different mobile ID's and different pre-selected messages can be associated with each ID. This feature is particularly useful when the member directs his goods or services to more than one field. Different messages can be sent by the member providing a different ID for use by a different requester who, for example, may be in a different field.

In this scenario, the non-member user (requester) initiates the request for the mobile business card/mobile signature so that it is sent to the requester's phone. The requester sends the unique ID provided to them by the member user (e.g. "rayray") to the server/short code gateway (e.g. "88500"). Such request may be sent at any point in time. Alternatively, the ID can expire after a preset period of time.

Figure 2:
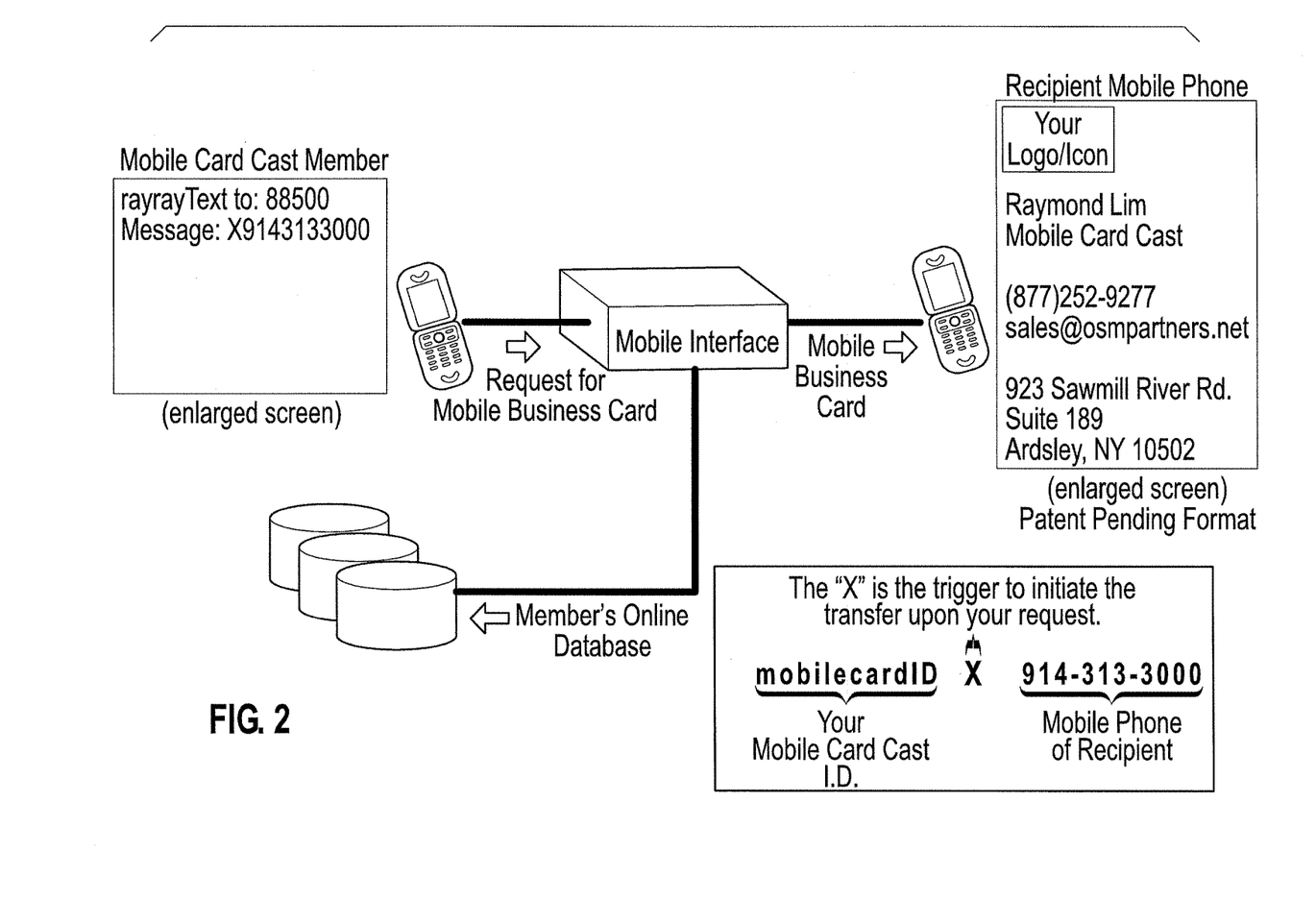
FIG. 2 shows a schematic diagram of another exemplary embodiment of the present disclosure.

According to another exemplary embodiment of the present invention, as shown schematically in FIG. 2, a member/user sends a text message to the server/short code gateway, with the member's mobile ID, e.g. "rayray," then a transfer code such as "X" followed by the cell phone number of the party to whom the mobile signature or mobile business card is to be sent, e.g., "9143133000."

The server/short code gateway, then sends the message corresponding to the code sent by the member to the third party's cell phone number. In FIG. 2, the message sent to the server/short code gateway "85000" by the member/user having the ID "rayray" would look like "rayrayX9143133000." The mobile signature or business card would then be sent from the server/short code gateway, to the third party at the phone number 914-313-3000. The message received by such party would have the customized form shown in FIG. 3. However, as above, the fields of information can be selected from a list and can vary depending on the member's preferences.

In the above scenario the member/user initiates the transfer of the information from the server/short code gateway to a third party. The member/user is thus able to send his mobile business card/mobile signature to any active cell phone number. The message sent would contain the mobile signature requested and could be sent to one or many phone number or numbers provided by the member user, simultaneously by the server/short code gateway.

As discussed above, by associating different information or messages with different mobile ID's, the member or user can direct the server to send multiple business cards to recipients in different fields.

According to various embodiments of the present invention, each card sent to a mobile phone or requested by a mobile phone will record the recipient's or the requester's cell phone number on the member's online system. The system will also enable a member to send multiple messages to more than one cell phone number or to only one number through the online gateway. All requested cell phone numbers will be stored in a real time database for members to view if their system is down or if they are traveling. If a member sends another member a mobile business card, the sending member's on-line database will record a copy of that mobile ID stored in the online system. The ID will be stored in a real time database for members to send messages to.

All information stored on a member's online database can be exported into other formats including, but not limited to, a universal text in an EXCEL compatible format in order to work with any conventional organizer.

Figure 3:
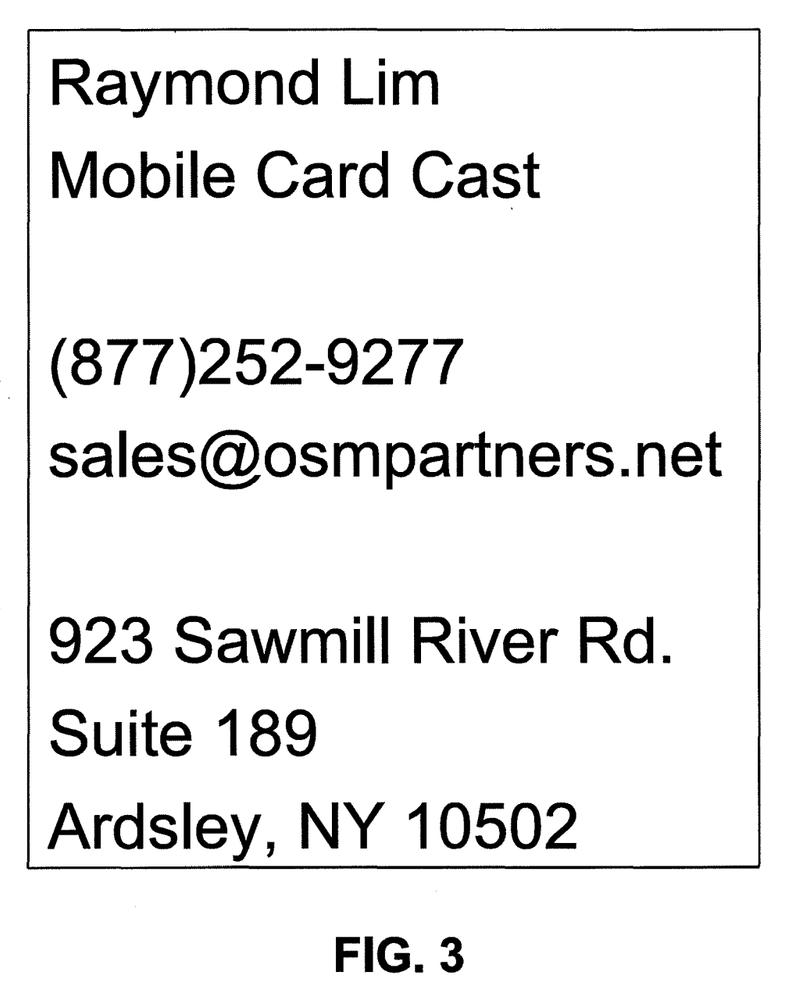
FIG. 3 shows an exemplary layout of the customized format the message will be received by a recipient in accordance with an exemplary embodiment of the present disclosure.

In addition, other information can be associated with the data record such as a photograph of the sender. At the present time, the file size limitation requires that the recipient add the photograph or other information to the file. However, it is anticipated that with modern compression techniques this feature can be incorporated within the present invention. In such case, as shown in FIGS. 1 and 2, a logo or photograph can be associated with the text message in a customized format as shown in FIG. 3.

A number of options are available for charging for such service. For example, the use of the server can be based on a term pricing or flat rate term (e.g., monthly), and/or meter usage pricing (per message or block of messages), various additional services, such as a backup and export feature, set up charge, bulk pricing for companies, etc., advertisement subsidized service, and the like.

The foregoing exemplary embodiments of the present invention are directed to a system and method for distributing a member's mobile signature or mobile business card. This is accomplished electronically, instead of handing out a traditional business card, a member or a requester simply sends the mobile identification number to the service, which then sends a third party or the requester the mobile signature/mobile business card in a useful, easy to read electronic form which can be further manipulated by the recipient. This will eliminate the concern about losing the business cards or having to retype the information. The actual mobile business card or mobile signature will also be readily exportable electronically into the recipient's cell phone contact database.

Figure 4:
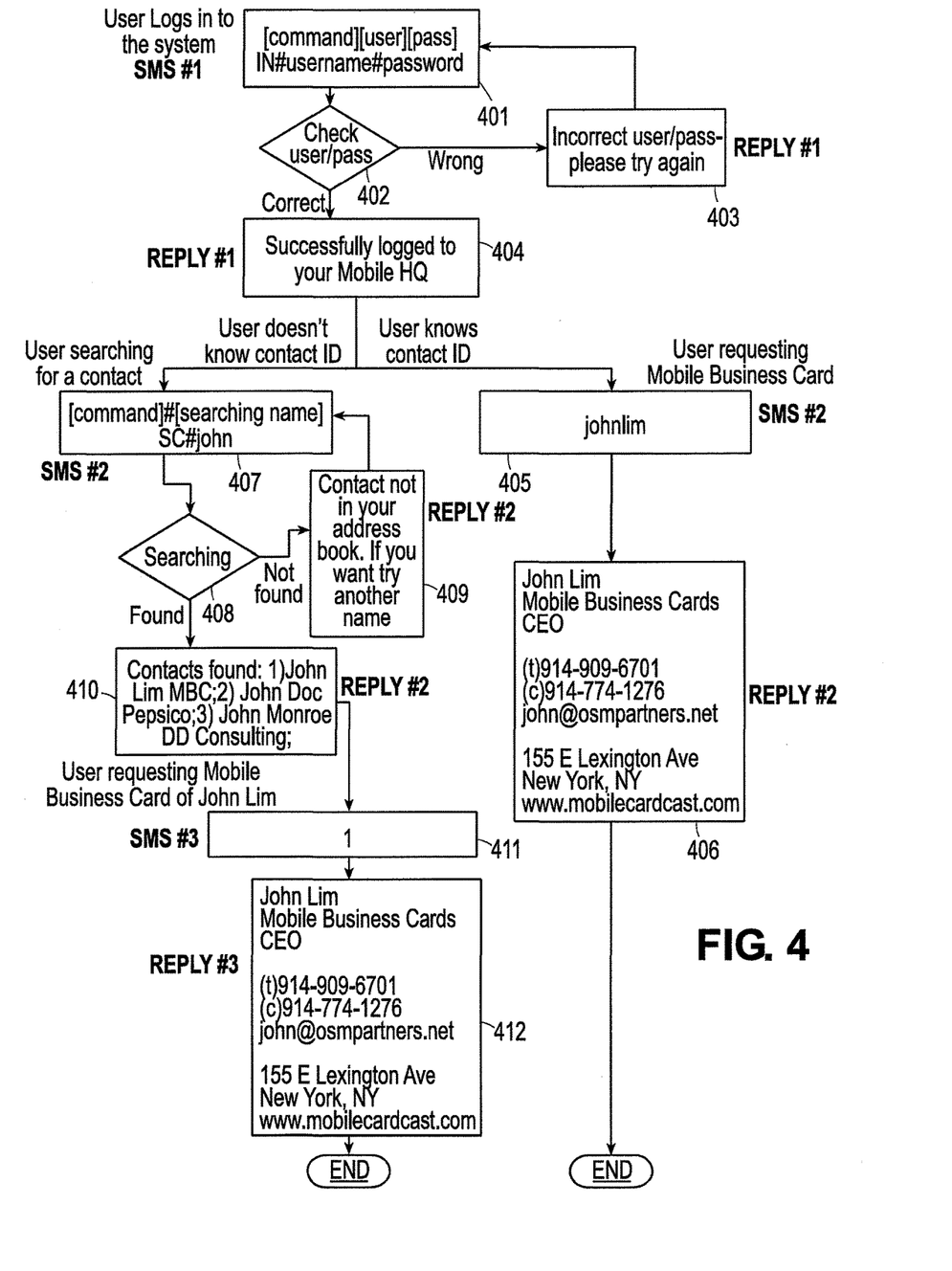
FIG. 4 shows a flow chart illustrating the steps for conveying contact information in accordance with an exemplary embodiment of the present disclosure.
Figure 5:
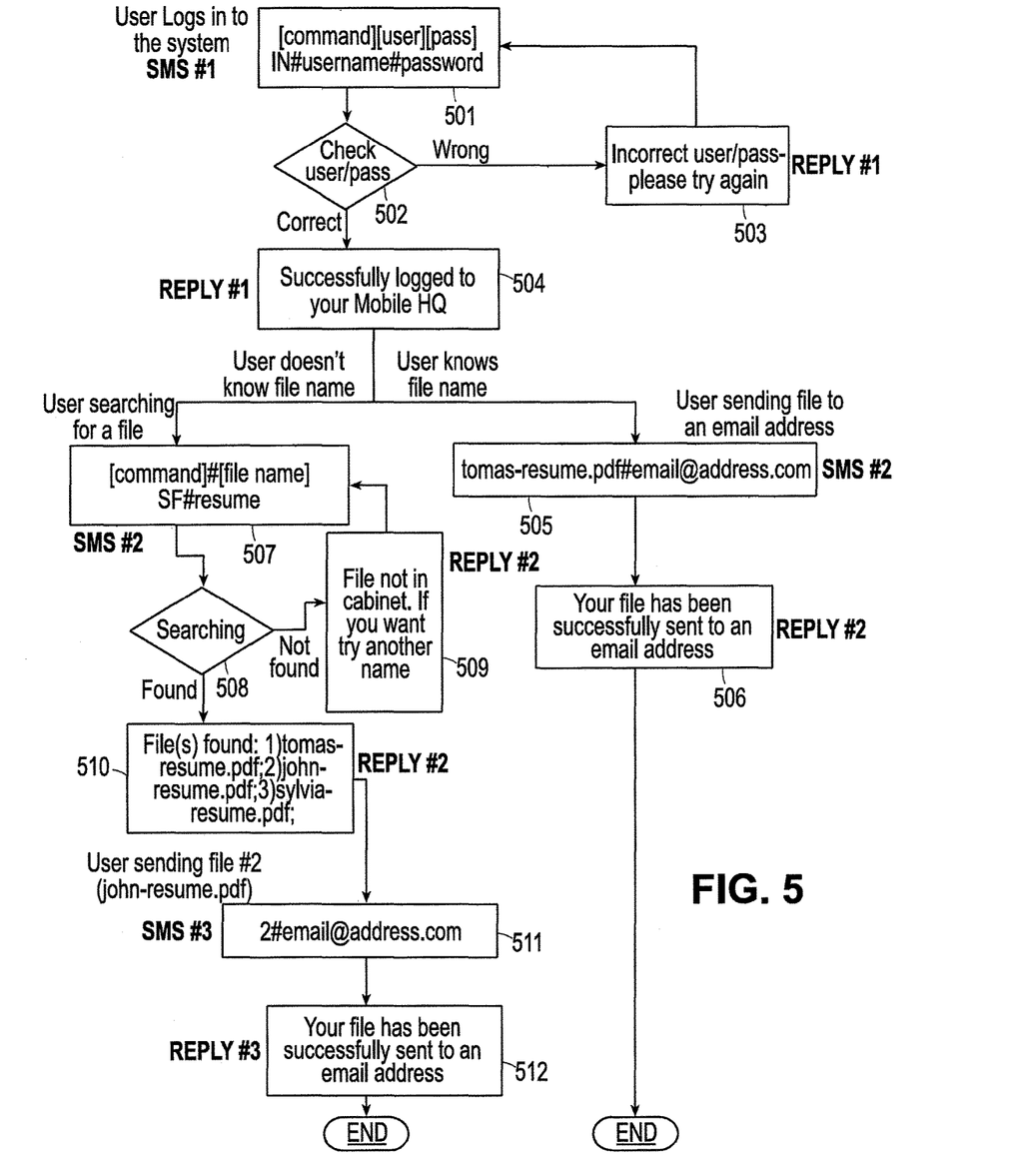
FIG. 5 shows a flow chart illustrating the steps for conveying file(s) in accordance with an exemplary embodiment of the present disclosure.

Additionally, the present invention may be utilized to search and send or receive any contact information (even other than the sender's own contact info) or file(s) stored in a server database, as shown in FIGS. 4 and 5. FIG. 4 is a flow chart illustrating the steps for conveying contact information (e.g., in the form of a customized mobile business card) in accordance with an exemplary embodiment of the present invention. A user of the illustrated service and system logs in to the system with secure user name and password (Step 401). The user's login information is checked by the system (Step 402), and if the user name and password are incorrect or unknown to the system, the user is prompted to try again and input the correct ones (Step 403). Once the user name and password are checked to be correct, then the user is alerted that he or she is successfully logged in to the system (Step 404).

If the user knows the complete contact ID for the mobile business card he or she wants to request, then the contact ID (in this case "johnlim") is entered and sent to the server via a cellular text message, such as a SMS message (Step 405). The user then receives the mobile business card associated with the contact ID in the exemplary customized format shown in FIG. 4 (Step 406).

On the other hand, if the user does not know the contact ID or does not have the complete contact ID available, then the user may command the server, via a cellular text message, to perform a search for, for example, the full name of a person whose contact information the user desires (Step 407). The search may be done based on just a single letter (e.g., "j"), or a first name (e.g., "john"), or any other appropriate search criteria provided by the user to the server. Preferably, the search command does not depend on any particular text messaging format, and a universal search command is used. The server then performs a search in its database based on the user's search criteria (Step 408).

If no search result is found, then the user is alerted that his or her address book does not contain the contact information and prompted to provide another name for searching (Step 409).

On the other hand, the server may come up with multiple search results that match the user's search criteria (e.g., search term 'john"). The server then sends to the user, via a cellular text message, a list of all contacts that match the user's search criteria (Step 410). Out of the multiple search results, the user may select one and request the server, via a cellular text message, to provide a mobile business card for the selected person (e.g., "1" associated with "John Lim MBC") (Step 411). The user then can receive and view the mobile business card associated with the selected search result in the exemplary customized format shown in FIG. 4 (Step 412). The user may further forward the mobile business card associated with the selected search result to any cellular phone in the same customized format. In alternative embodiments of the present disclosure, the server may forward a mobile business card not only to a cellular phone, but also to an e-mail address, another server, a computer, mobile device, or any hardware or device associated with the intended recipient of the contact information that is communicatively coupled to the server.

FIG. 5 shows a flow chart illustrating the steps for conveying file(s) (e.g., image or video files) in accordance with an exemplary embodiment of the present invention. A user of the illustrated service and system logs in to the system with secure user name and password (Step 501). The user's login information is checked by the system (Step 502), and if the user name and password are incorrect or unknown to the system, the user is prompted to try again and input the correct ones (Step 503). Once the user name and password are checked to be correct, then the user is alerted that he or she is successfully logged in to the system (Step 504).

If the user knows the file name he or she wants to request, then the file name and forward e-mail address are entered and sent to the server via a cellular text message (Step 505). The server then forwards the requested file to the forward e-mail address via, for example, the Internet, without using the Internet on the cellular phone. Accordingly, such file forwarding in accordance with the present invention can be made universal to any cellular phone models. The user then receives a confirmation from the server that the requested file has been successfully sent to the forward e-mail address (Step 506).

On the other hand, if the user does not know the file name, then the user may command the server, via a cellular text message, to perform a search for a file (Step 507). Based on search criteria provided by the user (e.g., "resume"), the server performs a search in its database (Step 508).

If no file is found that matches the search criteria, then the user is alerted that his or her file cabinet does not contain the file and prompted to provide another file name for searching (Step 509).

On the other hand, the server may find multiple files that match the user's search criteria. The server then sends to the user, via a cellular text message, a list of all files that match the user's search criteria (Step 510). Out of the multiple search results, the user may select a certain file(s) and request the server via a cellular text message to forward the selected file(s) (e.g., "2" associated with the file "john-resume.pdf") to an e-mail address (Step 511). The server then forwards the requested file to the forward e-mail address via, for example, the Internet, without using the Internet on the cellular phone. Preferably, this file forwarding is universal to any cellular phone models under the present invention. The server then sends a confirmation to the user in a cellular text message that the requested file has been successfully sent to the forward e-mail address (Step 512). In alternative embodiments of the present invention, the server may forward the file(s) not only to an e-mail address, but also to another server, a computer, a mobile device, or any hardware or device associated with the intended recipient of the file(s) that is communicatively coupled to the server.

It is to be understood that while certain forms of the present invention have been illustrated and described herein, it is not to be limited to the specific forms or arrangement of parts described and shown. The present embodiments are therefore to be considered in all respects as illustrative and not restrictive. Accordingly, the spirit and scope of the present invention is to be construed broadly.

What is claimed is:

1. A computer-implemented method, performed between cellular communications devices, for requesting database records from a database server over a cellular communications network, the method comprising:

receiving, at a first cellular communications device, a first input comprising a request for data from a database stored by the database server, the request comprising a search criteria for a database record;

receiving, at the first cellular communications device, a second input comprising an address of the database server on the cellular communications network;

receiving, at the first cellular communications device, a third input comprising a forward address of a second cellular communications device to which the data is to be transmitted by the database server;

transmitting a first cellular text message comprising the search criteria and the forward address from the first cellular communications device to the address of the database server on the cellular communications network to perform a database search based on the search criteria, wherein the database server retrieves at least one database record, including the data, from the results of the database search;

responsively transmitting, from the database server to the second cellular communications device, a second cellular text message comprising the data corresponding to the request via the cellular communications network, and responsive display the data on the second cellular communication device.

2. The method of claim 1, where the data comprises contact information of an individual.

3. The method of claim 1, said forward address comprising at least one of: a cellular telephone number, a mobile device number, an e-mail address, a computer address, a server address, or a computing device address.

4. The method of claim 1, wherein at least one of the first and second cellular text message comprises a Short Message Service (SMS) message.

5. The method of claim 1 wherein the address comprises a Short Message Service (SMS) address.

6. The method of claim 1, wherein when a plurality of database records are retrieved in response to the request, the second cellular text message comprises an identification of each of the plurality of database records.

7. The method of claim 6, further comprising:
receiving, at the first cellular communications device, a third input comprising a selection of one of the identifications of the plurality of database records, and
transmitting, from the first cellular communications device, a third text message comprising the selection to the database server via the cellular communication device.

8. The method of claim 7, further comprising:
transmitting, from the database server to the second cellular communications devices, a database record corresponding to the selection.

9. The method of claim 1, where the cellular communication devices comprise at least one of a cellular telephone and a computing device.

10. The method of claim 1, wherein the data comprises a customized mobile business card.

* * * * *